US007460955B2

(12) United States Patent
Woz

(10) Patent No.: US 7,460,955 B2
(45) Date of Patent: Dec. 2, 2008

(54) SYNCHRONIZATION OF AN EXTERNAL DEVICE USING A GPS RECEIVER

(75) Inventor: Bret Woz, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 477 days.

(21) Appl. No.: 11/401,143

(22) Filed: Apr. 10, 2006

(65) Prior Publication Data

US 2007/0239356 A1 Oct. 11, 2007

(51) Int. Cl.
*G01S 1/00* (2006.01)

(52) U.S. Cl. .................. 701/213; 701/200; 342/357.06; 342/357.12

(58) Field of Classification Search ................. 701/200, 701/213–215; 342/357.06, 357.012
See application file for complete search history.

(56) References Cited

U.S. PATENT DOCUMENTS

2006/0116820 A1* 6/2006 Mori et al. .................. 701/213
2007/0250266 A1* 10/2007 Mori et al. .................. 701/213

* cited by examiner

*Primary Examiner*—Yonel Beaulieu
(74) *Attorney, Agent, or Firm*—Darby & Darby; Robert J. Sacco

(57) ABSTRACT

A method for synchronization of an external device's clock 324 with a GPS device 104 is provided. The method can comprise processing one or more data sentences received at the external device 106 from the GPS device to determine a data sentence containing the best available time information that is most accurate among the data sentences. Also, an amount of correction can be determined to compensate for one or more variable time delays introduced by one or more processes. The one or more processes can selected from a group consisting of a process performed by the GPS device $t_{1b}$, a data sentence transmission from the GPS device to the external device $t_{2b}$, and a data processing step performed by the external device $t_{3b}$. A synchronization time using the amount of correction and the best available time information can be provided. The method can further comprise correcting a timing error introduced into time stamp values by the external device clock. This step can include removing an accumulate error by restarting the method after a pre-defined amount of time (e.g., one hour).

20 Claims, 14 Drawing Sheets

SYNCHRONIZATION OF AN EXTERNAL DEVICE USING A GPS RECEIVER

BACKGROUND OF THE INVENTION

1. Statement of the Technical Field

The invention concerns timing synchronization of non-GPS equipment, and more particularly synchronizing the time of day clock used on non-GPS type equipment based on a time of day signal output from a GPS receiver.

2. Description of the Related Art

Global positioning systems are typically comprised of a plurality of satellites and a global positioning system (GPS) receiver. GPS satellites have onboard atomic clocks. The satellites also transmit a radio signal that includes the precise time according to the onboard atomic clock. The atomic clocks on the satellites are set to "GPS time". By definition, GPS time is the number of seconds since 00:00:00 UTC, Jan. 6, 1980. GPS receivers apply to this received signal a clock-correction offset (which is periodically transmitted along with the other data) in order to accurately determine the correct UTC time. The GPS receiver can also automatically adjust for a local time zone. Consequently, a GPS receiver can serve as a highly accurate time clock. In fact, one of the most common applications of the GPS system is for use as a time of day (TOD) reference clock.

Some GPS receivers can include a digital output that can include such TOD information. For example, the GPS receiver can generate an output in a format defined by the National Marine Electronics Association (NMEA). One such format is defined as NMEA 0183 compliant data. Such data is typically output on an RS-232 interface as an asynchronous serial data transmission at a baud rate of 4800.

NMEA 0183 compliant data includes several approved types of data sentences, including one which is referred to as GPRMC. The GPRMC sentence includes, among other items of information, TOD data determined by the GPS receiver. The TOD data is generally expressed as UTC time. Notably, this TOD data can be useful for synchronizing non-GPS equipment.

While GPS based time clock systems are quite common, there remain some problems associated with the use of TOD data provided by a GPS receiver. This is particularly true where a device external to a GPS receiver needs a very precise and accurate source of time. One such problem relates to variable delays and timing errors introduced by the GPS receiver in connection with the processing and transmission of TOD data from the GPS receiver to the external device. Consequently, a systematic method is needed to correct or at least minimize these errors.

SUMMARY OF THE INVENTION

The invention concerns a method for synchronizing a clock of an external device with a GPS device. The method can comprise processing one or more data sentences received at the external device from the GPS device. This step can be performed to determine a data sentence containing a best available time information that is most accurate among the data sentences. An amount of correction can also be determined to compensate for variable time delays introduced by one or more processes. The one or more processes can be selected from the group consisting of a process performed by the GPS device, a data sentence transmission from the GPS device to the external device, and a data processing step performed by the external device. Thereafter, a synchronization time using the amount of correction and the best available time information can be determined. The method can further comprise correcting a timing error introduced by the external device clock. This step can include removing an accumulated error by restarting the method after a predefined amount of time (e.g., one hour).

In accordance with an aspect of the invention, the 'processing one or more data sentences' step can comprise associating a time stamp with each of the data sentences. This step can further comprise setting a first reference time stamp equal to a time stamp associated with a first data sentence. Thereafter, a difference between a time stamp associated with a second data sentence and the first reference time stamp can be determined. If the difference is less than a defined time increment (e.g., two seconds), the first reference time stamp can be set equal to the time stamp associated with a second data sentence. If the difference is equal to or greater than the defined time increment, the defined time increment can be added to the first reference time stamp.

The 'determining an amount of correction' step can comprise setting a second reference time stamp equal to a time stamp associated with the most accurate data sentence. This step can also comprise storing a value that specifies the number of bytes of a first frame of sentence data associated with the most accurate data sentence. Thereafter, a transmission time defining a time interval associated with transmitting the last received data sentence from the GPS device to the external device can be determined. This step can further comprise calculating a difference between the second reference time stamp and a time stamp associated with the last received data sentence.

If the difference is less than a defined time increment, the second reference time stamp can be set equal to the time stamp associated with the last received data sentence. Also, a value that specifies the number of bytes of a first frame of sentence data associated with the last received data sentence can be stored. The external device's processing time can be determined as well. Subsequently, a synchronization time can be determined by adding the transmission time, the external device processing time, and a time specified in a data sentence associated with the last received data sentence.

If the difference is equal to or greater than the defined time increment, the defined time increment can be added to the second reference time stamp. Also, a GPS device processing time can be determined by subtracting a predefined time increment (e.g., two seconds) from the difference. An external device processing time can be determined as well. Thereafter, a synchronization time can be determined by adding the GPS device processing time, the transmission time, the external device processing time, and a time specified in a data sentence associated with the last received data sentence.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
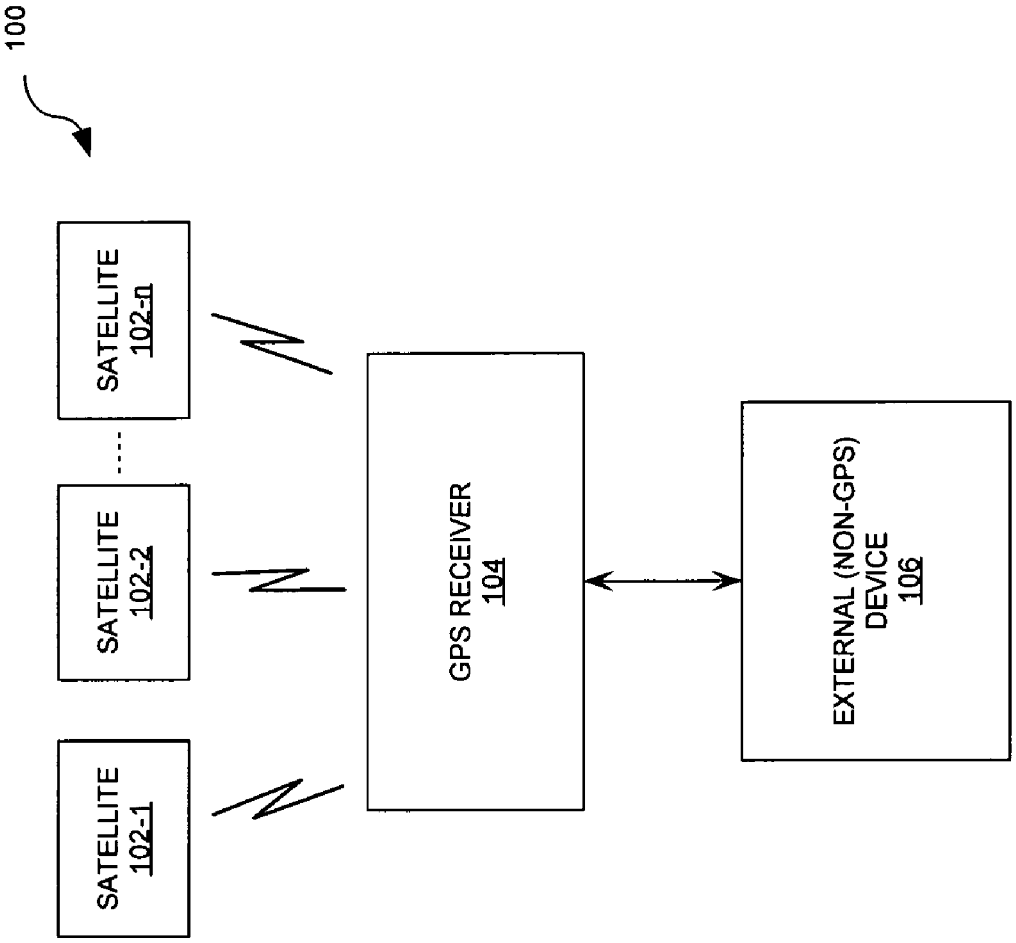
FIG. 1 is a block diagram that is useful for understanding how time data from a GPS receiver can be communicated to an external non-GPS device.

FIG. 1 is a block diagram of a global positioning system 100. Global positioning system (GPS) 100 is typically comprised of at least 24 earth orbiting satellites 102-1, 102-2, **102-*n*, and a GPS receiver 104. Typically there are about 11 satellites in view of a GPS receiver 104 from a location on earth. However, the invention is not limited with regard to the number of satellites. Satellites 102-1, 102-2, 102-*n*** have onboard atomic clocks and transmit a radio signal that includes the precise time according to their own internal clock. The atomic clocks on the satellites are set to "GPS time". By definition, GPS time is the number of seconds since 00:00:00 UTC, Jan. 6, 1980. GPS receivers apply to this received signal a clock-correction offset (which is periodically transmitted along with the other data) in order to accurately determine the correct UTC time. The receiver can also automatically adjust for a local time zone. Consequently, the GPS receiver can serve as a precise, highly accurate source of time of day (TOD) information.

The TOD information available from a GPS receiver can be communicated to a device external to the GPS receiver using a variety of protocols. One such protocol is defined by the National Marine Electronics Association (NMEA). For example, NMEA 0183 compliant data is output on an RS-232 interface as an asynchronous serial data transmission at a baud rate of 4800. NMEA 0183 compliant data includes several approved types of data sentences, including one which is referred to as NMEA Recommended Minimum sentence ("RMC"). A NMEA RMC sentence is typically comprised of GPS transit data including time data, date data, position data, course data, and speed data. A NMEA RMC sentence is structured in the following manner:

$--RMC,hhmmss.ms,A,llll.ll,a',yyyy.yy,a",x.x',x.x",xxxxxx, x.x'",a'",a*hh<CR><LF> where hhmmss.ms is a coordinated universal time of a position fix. A is a status indicator (e.g., A indicates active, V indicates invalid). llll.ll,a' is a latitude including a north (i.e., n) or south (i.e., s) indication. yyyy.yy,a" is a longitude including a east (i.e., e) or a west (i.e., w) indication. x.x' is a speed over ground value in knots. x.x" is the bearing, i.e., the course over ground in true degrees. xxxxxx is the date (e.g., ddmmyy). x.x'",a'" is the magnetic variation in degrees including a east or west indication. a* is a mode indicator (for example, A indicates autonomous mode, D indicates differential mode, E indicates estimated mode, M indicates manual input mode, S indicates, simulator mode, and N indicates data not valid). *hh is a checksum data.

The foregoing description of a NMEA RMC sentence is useful for understanding conventional NMEA RMC sentence structure. In this regard, a more detailed description of the NMEA RMC sentence can be found in "National Marine Electronics Association, NMEA 0183 Standard for Interfacing Marine Electronic Devices Version 3.01, January 2002." The entire disclosure of this publication is incorporated herein by reference.

A person skilled in the art will appreciate that the GPS system 100 is one embodiment of a hardware architecture in which the methods described below can be implemented. Similarly, it should be understood that NMEA protocol is merely one possible data transmission protocol that can be used for communicating data from a GPS receiver to a device external to the GPS receiver. Accordingly, the invention is not limited in this regard. Any other suitable GPS system architecture and data communication protocol can be used without limitation.

Figure 2:
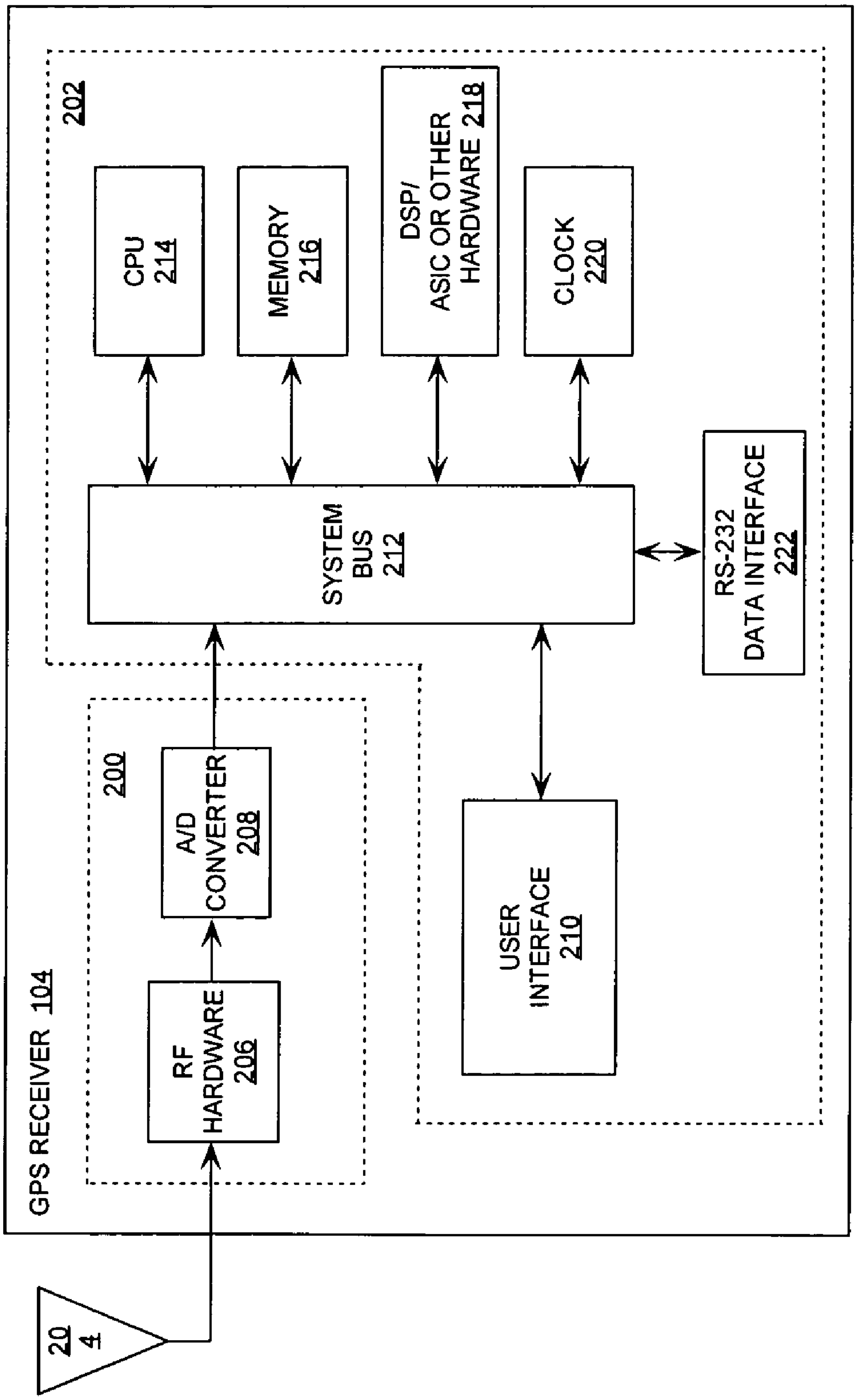
FIG. 2 is a block diagram of a global positioning system receiver that is useful for understanding the invention.

FIG. 2 is a block diagram of a GPS receiver 104 that is useful for understanding the invention. GPS receiver 104 is comprised of a radio device 200 and a computer processing device 202. Radio device 200 includes an antenna element 204, RF hardware 206, and an analog to digital converter 208. RF hardware 206 can include filters and/or amplifiers. The components of the radio device 200 are generally known to persons skilled in the art and therefore will not be described in detail herein.

Computer processing device 202 is comprised of an RS-232 data interface 222, a user interface 210, a central processing unit 214, a clock 220, a system bus 212, a memory 216 connected to and accessible by other portions of the computer processing device 202 through system bus 212, and DSP/ASIC and/or other hardware entities 218 connected to system bus 212. User interface 210 facilitates a user action to create a request to access a software application for establishing a radio link to a satellite, receiving a communication from a satellite, and sending a communication to a external device 106. User interface 210 may comprise a display screen and an input means, such as a keyboard, a keypad, a directional pad, and/or a directional knob. Clock 220 can be comprised of an oscillator and a counter that encodes a time value as a sequence of bits. Clock 220 performs processing for the advancement of time by adding a time value in bits to the sequence of bits stored in memory 216.

At least some of the hardware entities 214, 218 perform actions involving access to and use of memory 216, which may be a RAM, a disk driver, and/or a CD-ROM. Hardware entities 214, 218 may include microprocessors, digital signal processors, ASICs, and/or other hardware. Hardware entities 214, 218 may include a microprocessor programmed for processing a signal including ranging codes and navigation data.

Hardware entities 214, 218 may further include a microprocessor programmed for formatting a NMEA RMC sentence. Hardware entities 214, 218 may also include a microprocessor programmed for sending NMEA RMC sentences to a device 106 that is external to a GPS receiver. The RMC sentence can be transmitted at set increments of time. For example, taking into consideration the data rate, and the volume of data to be transmitted it can be desirable to transmit the RMC sentence at a set increment of every two (2) seconds.

RS-232 data interface 222 provides a link between the GPS receiver 104 and the external device 106. RS-232 data interface 222 provides asynchronous serial transmission of a signal including NMEA RMC sentence data and NMEA standard signaling protocols at a 4800 baud rate. RS-232 data interface 222 outputs eight (8) bits per character where the first bit is a start bit and the last bit is a stop bit. NMEA standard signaling protocols are well known to persons skilled in the art. Thus, NMEA standard signaling protocols will not be described in great detail herein.

A person skilled in the art will appreciate that the GPS receiver 104 hardware architecture is one embodiment of a hardware architecture in which the methods described below can be implemented. However, the invention is not limited in this regard and any other suitable GPS receiver hardware architecture can be used without limitation.

Figure 3:
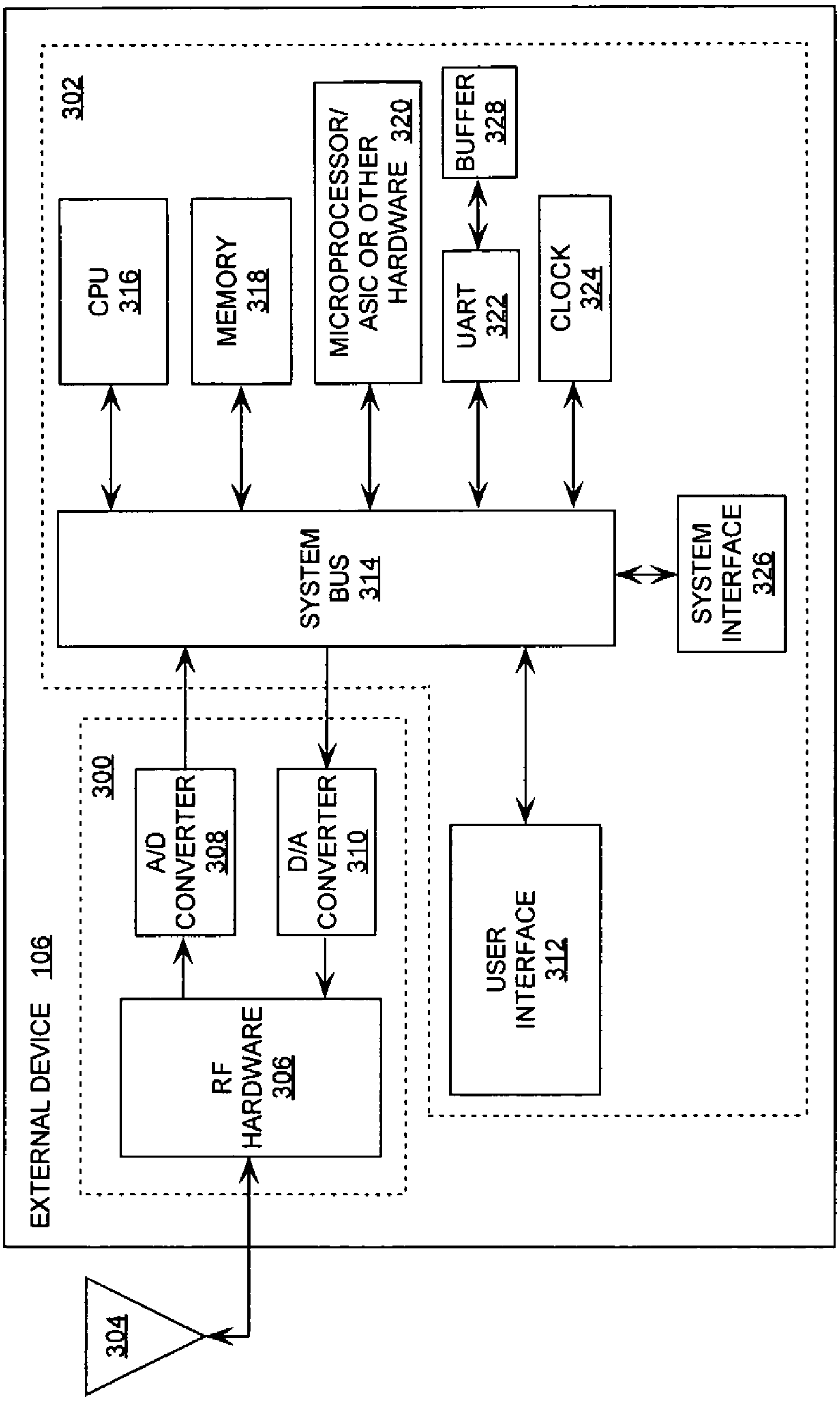
FIG. 3 is a block diagram of a device requiring synchronization that is useful for understanding the invention.

FIG. 3 is a block diagram of external device 106. In the block diagram shown, the external device 106 is a radio system that requires highly precise and accurate TOD information. For example, the radio system can be a synchronous data communications radio. Still, it should be understood that the invention is not limited to any particular type of external device requiring precise and accurate TOD information. Instead, the invention can be implemented in any such device.

Referring again to FIG. 3, it can be observed that external device 106 can include a radio component 300 and a computer processing component 302. Radio component 300 can include an antenna element 304, RF hardware 306, an analog to digital converter 308, and a digital to analog converter 310. RF hardware 306 can include filters and/or amplifiers. The foregoing elements of the radio component 300 are known to persons skilled in the art. Moreover, they are not critical for an understanding of the invention. Accordingly, these elements will not be described in detail herein.

Computer processing component 302 is typically comprised of a system interface 326, a user interface 312, a central processing unit 316, a universal asynchronous receiver/transmitter (UART) 322, a clock 324, a system bus 314, a memory 318 connected to and accessible by other portions of the computer processing device 302 through system bus 314, and hardware entities 320 connected to system bus 314. At least some of the hardware entities 320 perform actions involving access to and use of memory 318, which may be a RAM, a disk driver, and/or a CD-ROM. Hardware entities 320 can include microprocessors, ASICs, DSPs, and other hardware. Hardware entities 320 may include a microprocessor programmed for setting clock 324 using a synchronization algorithm. The synchronization algorithm will be described in detail below.

User interface 312 facilitates a user action to create a request to access a software application for establishing a radio link, for transmitting a communication, and receiving a communication. User interface 312 may comprise a display screen and an input means, such as a keyboard, a keypad, a directional pad, and/or a directional knob. Clock 324 is typically comprised of an oscillator and a counter that encodes a time value as a sequence of bits. Clock 324 can perform processing for the advancement of time by adding a time value in bits to the sequence of bits, which may be stored in memory 318.

The UART 322 provides data flow control and data buffering. For example, the UART 322 performs processing of the NMEA RMC sentence data for placement in buffer 328 (e.g., an eight (8) bit buffer). Buffer 328 performs processing to place NMEA RMC sentence data in a queue having a defined data structure, such as a first-in-first-out (FIFO) data structure.

A person skilled in the art will appreciate that external device 106 hardware architecture is one embodiment of a hardware architecture in which the methods described below can be implemented. However, the invention is not limited in this regard and any other suitable external device hardware architecture can be used without limitation.

Figure 4:
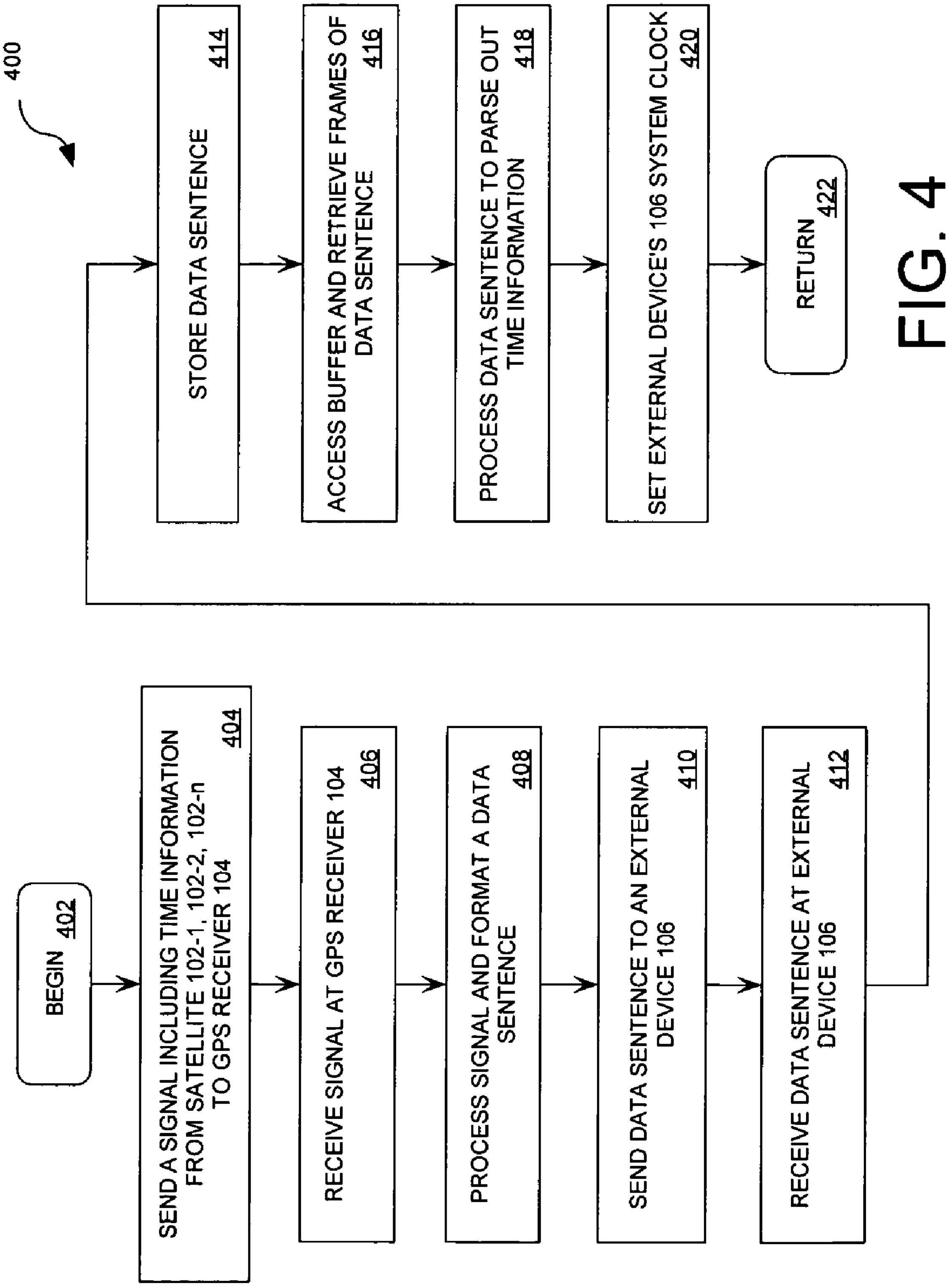
FIG. 4 (PRIOR ART)
FIG. 4 is a process flow diagram of that is useful for understanding how GPS timing data can be used by an external non-GPS device.

FIG. 4 is a flow diagram of a global positioning system synchronization method that is useful for understanding the invention. Synchronization method 400 begins at 402 and continues with 404. In step 404, a satellite 102-1, 102-2, 102-4, 102-6 sends a conventional GPS signal to the GPS receiver 104. GPS receiver 104 receives the signal in step 406. After receipt of the signal, GPS receiver 104 performs signal processing that includes calculating a UTC time of day, and formatting a data sentence. For example, the GPS receiver can format an NMEA RMC sentence. The data sentence can be formatted into frames of data having a start bit and a stop bit. Each frame often includes one or more bytes of data. Upon formatting the data sentence, GPS receiver 104 can send a message including the frames of sentence data to the external device 106 in step 410. External device 106 receives the message in step 412. After receipt of the message, external device 106 places the sentence data in one or more buffers 328. The one or more buffers 328 can place the data in a queue having a first-in-first-out queue data structure in step 414. Once the first frame of data is placed in a queue by the one or more buffers 328, the external device 106 applies a time stamp to the data using its internal clock 324. After step 414, external device 106 accesses the one or more buffers 328 and retrieves the frames of data in step 416. After retrieving all the frames of sentence data, external device 106 processes the data to parse out time information in step 418. Subsequent to parsing out the time information, external device 106 calculates a difference between the time specified by internal clock 324 and the time specified in the sentence data in step 420. Once the difference has been calculated, external device 106 determines if clock 324 needs to be updated. For example, external device 106 can be programmed so that it will not update clock 324 if the difference between the time specified by internal clock 324 and the time specified in the data sentence equals zero. After external device 106 updates clock 324, step 422 is performed where synchronization method 400 returns to step 402.

The foregoing system assumes that the time specified in the data sentence is precise and accurate. Such precision and accuracy can presumably be found when the UTC time was originally determined in the GPS receiver. However, timing delays and errors will inevitably result from the processing of the data sentence in the GPS receiver, transmission of the data from the GPS receiver 104 to the external device 106, and processing delays in the external device 106. Compounding these timing delays is that, at least for NMEA messages, no interrupt occurs. This means that while the GPS TOD information may be accurate when determined, it may no longer be so when the TOD data is finally used by an external device 106. The time delays described herein can be illustrated with reference to FIG. 5 and FIG. 6.

Figure 5:
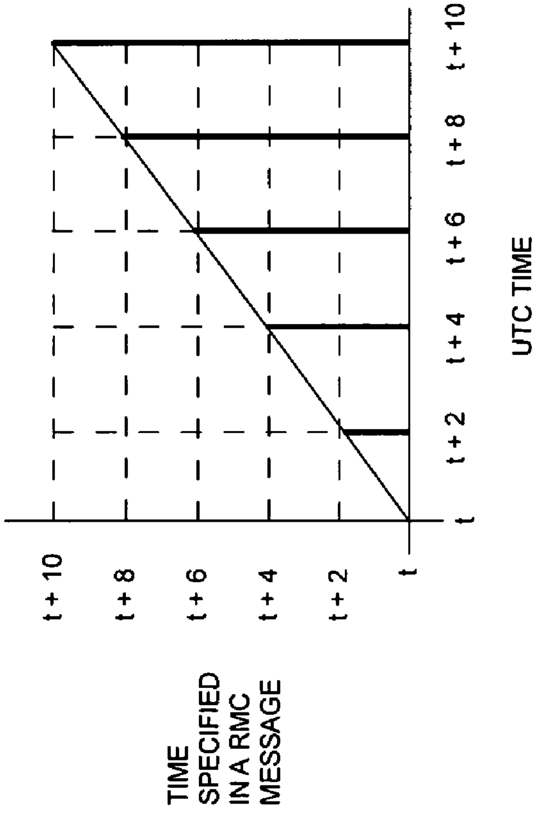
FIG. 5 (PRIOR ART)
FIG. 5 is a time graph showing a time of day in a GPRMC message versus the theoretical ideal timing of GPRMC messages.
Figure 6:
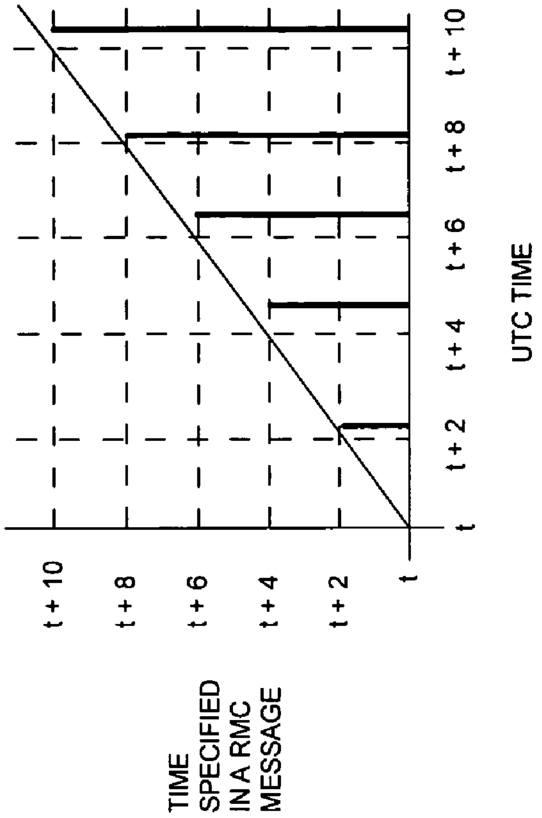
FIG. 6 (PRIOR ART)
FIG. 6 is a time graph showing a time of day in a GPRMC message versus the actual timing of GPRMC messages.

The timing graphs in FIG. 5 and FIG. 6 are plots of radio device clock times versus UTC time. These plots assume that data sentences are communicated from the GPS receiver 104, to the external device 106 once every two seconds in accordance with a typical NMEA scenario. The graph of FIG. 5 illustrates data sentences received at an external device 106 every two (2) seconds. This graph represents an ideal situation absent of time delays caused by data processing and signal transmissions. The graph of FIG. 6 illustrates a more realistic scenario with data sentences received at a radio device every two (2) seconds plus some variable time delay (i.e., a system having variable time delays due to data processing and signal transmissions).

Figure 7:
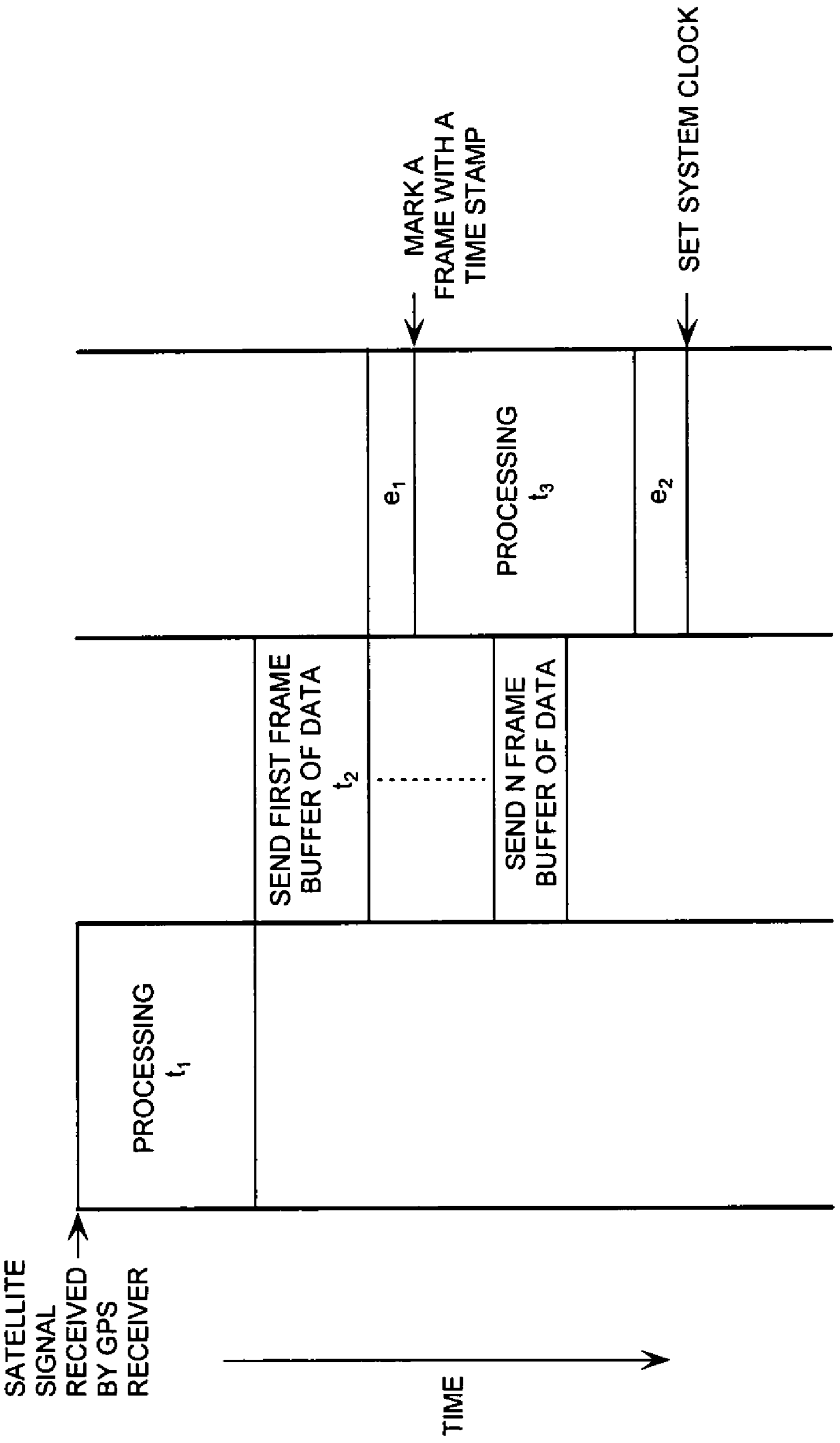
FIG. 7 (PRIOR ART)
FIG. 7 is a timing diagram that is useful for understanding timing errors generated by the synchronization method of FIG. 4.

Referring now to FIG. 7, there is provided a timing diagram illustrating a time delay generated by synchronization method 400 when one (1) data sentence arrives at a radio device 106. Referring to FIG. 7, it can be understood that:

$t_1$ is the time GPS receiver 104 takes to process a signal to format a data sentence;

$t_2$ is the time needed to transmit a first frame of data sentence data from GPS receiver 104 to external device 106;

$t_3$ is the time between when the first frame of data sentence data is pulled from one or more buffers 328 to the time the external device 106 is about to set clock 324;

$e_1$ is the time needed to place the first frame of data sentence data in one or more buffers 328; and $e_2$ is the sum of the time a external device 106 takes to calculate $t_3$, the time the external device 106 takes to calculate the difference between the time reported by GPS receiver 104 and the clock's 324 time, and the time external device 106 takes to set clock 324.

The time delays shown in FIG. 7 can be described as a mathematical function represented by sets of mathematical equations. Assuming that the data sentence is an NMEA protocol RMC sentence, the time the external device 106 parses out of the RMC data sentence can be represented as $T_{NMEA}$. The total time spent processing and transmitting the message from the GPS receiver to the external device 106 can be represented as $T_{PT}$. Given the foregoing, the actual UTC time ($T_{UTC}$) can be represented by Equation (1) as follows:

$$T_{UTC}=T_{NMEA}+T_{PT} \qquad (1)$$

The mathematical equation describing $T_{PT}$ for the illustrated embodiment is given below as Equation (2).

$$T_{PT}=t_1+t_2+t_3+e_1+e_2 \qquad (2)$$

It can safely be assumed that $e_1$ and $e_2$ are insignificant timing errors generated by an external device 106. Accordingly, Equation (2) can be reduced to Equation (3).

$$T_{PT}=t_1+t_2+t_3 \qquad (3)$$

Assuming that the UTC time ($T_{UTC}$) and the time of clock 324 ($T_{RAD}$) are approximately the same, Equation (1) can be rewritten.

$$T_{UTC}=T_{RAD}=T_{NMEA}+T_{PT} \qquad (4)$$

By combining Equation (4) with Equation (3), a mathematical equation describing $t_1$ can be provided. The mathematical equation is given below as Equation (6).

$$T_{RAD}=T_{NMEA}+t_1+t_2+t_3 \qquad (5)$$

$$t_1=T_{RAD}-T_{NMEA}-t_2-t_3 \qquad (6)$$

Assuming that the first frame of the NMEA RMC sentence is received by a radio device 106, mathematical equations describing $t_2$ and $t_3$ can be provided. The mathematical equation describing $t_2$ is given below as Equation (7).

$$t_2=\frac{\left(F_s*\frac{10\text{ bits}}{\text{byte}}\right)}{4800\,\frac{\text{bits}}{\text{s}}}*\frac{10^6\,\mu\text{s}}{\text{s}} \qquad (7)$$

where $F_s$ is the first frame size in bytes, excluding a start bit and a stop bit. It should be understood that the term "frame," as used herein, refers to a collection of characters. Each character consists of eight (8) bits plus one start bit and one stop bit (i.e., sentence data is transmitted in a ten (10) bit form). The start and stop bit are automatically stripped from the collection of characters so that the "frame" size equals eight (8) bits (i.e., one (1) byte) of data per character.

The mathematical equation describing $t_3$ is given below as Equation (8).

$$t_3=T_{RAD}-T_{TS} \qquad (8)$$

where $T_{RAD}$ is the current time of clock 324. $T_{TS}$ is the time stamp taken when the first frame of NMEA RMC sentence data is placed in one or more buffers 328 by radio device 106.

The actual value of $T_{PT}$ will vary from one GPS receiver to another, even within a particular GPS receiver design. The value of $T_{PT}$ can also vary from one data sentence to the next within a particular GPS receiver. Given the foregoing, it can be desirable to automatically remove outlier TOD data from the GPS data stream, and to reduce the amount of variation in the error of the GPS time samples. A process can be implemented as hereinafter described which can help to achieve both of these objectives. The forgoing Equations (1)-(8) can be useful for systematically removing timing errors from data transmitted to a device external to GPS receiver 104.

Figure 8:
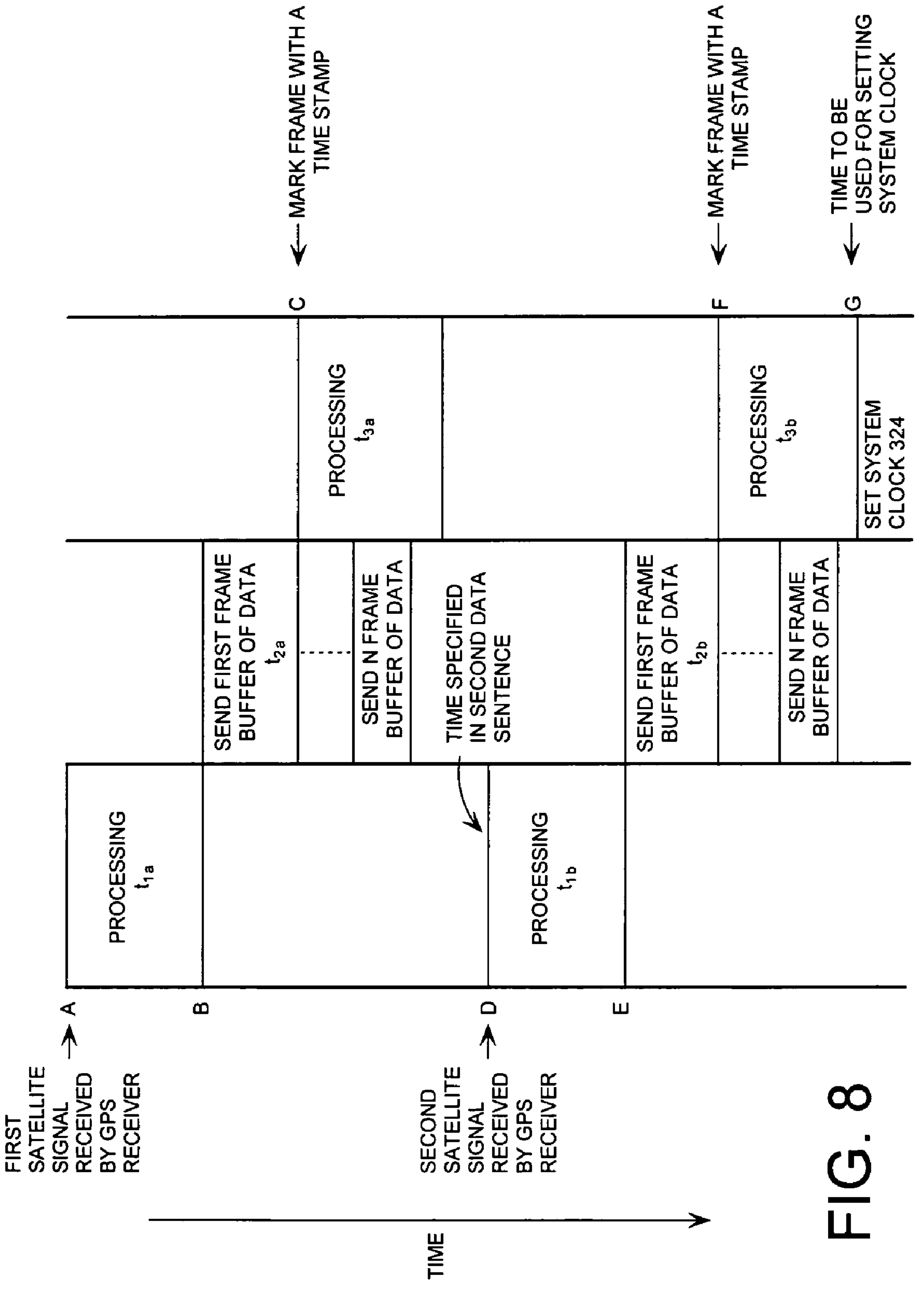
FIG. 8 is a timing diagram that is useful for understanding timing errors generated by the synchronization method of FIG. 4.

FIG. 8 is a timing diagram that is useful for understanding timing errors generated by a synchronization method 400 as two (2) data sentences arrive at an external device 106. At timing marker "A", a first signal sent by a satellite 102-1, 102-2, **102-*n* is received at GPS receiver 104. Upon receipt of the first signal, GPS receiver 104 will process the first signal to format a first data sentence. The time required for GPS receiver 104 to process the first signal can be defined as $t_{1a}$. After formatting a first data sentence, GPS receiver 104 will transmit the first data sentence to external device 106 at timing marker "B". The time needed to transmit a first frame of a first sentence data to external device 106 can be defined by $t_{2a}$. Upon receipt of the first frame, external device 106 can mark the frame with a time stamp at timing marker "C". After marking the frame with a time stamp, external device 106 can process the data sentence. The time external device 106** takes to process the data sentence can be defined as $t_{3a}$.

At timing marker "D", a second signal sent by a satellite 102-1, 102-2 is received at GPS receiver 104. Upon receipt of the second signal, GPS receiver 104 will process the second signal to format a second data sentence. The time GPS receiver 104 takes to process the second signal can be defined as $t_{1b}$. After formatting a second data sentence, GPS receiver 104 will send the second data sentence to external device 106 at timing marker "E". The time needed to send a second frame of second sentence data to external device 106 can be defined by $t_{2b}$. Upon receipt of the first frame, external device 106 can mark the frame with a time stamp at timing marker "F". After marking the frame with a time stamp, external device 106 can process the data sentence. The time external device 106 takes to process the NMEA RMC sentence can be defined as $t_{3b}$.

The time delay generated by GPS receiver 104 and external device 106 can be described as a set of mathematical functions. Mathematical equations describing one example of a GPS receiver 104 time delay function for the illustrated embodiment are given below as Equation (9) and Equation (10).

Referring again to FIG. 8, it is reasonable to assume that the time difference between point A and point D is two (2) seconds with a high degree of accuracy. Experimentation has shown that in most instances, the transmission times $t_{2a}$, $t_{2b}$ are equal. If it is further assumed that the time a GPS receiver 104 takes to process a signal is the same per sample (i.e., $t_{1a}$ is equal to $t_{1b}$), then the time difference between the time stamp at timing marker "F" and the time stamp at timing marker "C" can be expressed as Equation (9).

$$TS_F - TS_C = 2 \text{ seconds} \quad (9)$$

where $TS_C$ is a first time stamp taken after a first frame of sentence data is processed for placement in buffer 328. $TS_F$ is a second time stamp taken after a first frame of second sentence data is processed for placement in buffer 328. However if it is assumed that the time a GPS receiver 104 takes to process a signal (i.e., $t_{1a}$ and $t_{1b}$) varies per sample (i.e., $t_{1a}$ is not equal to $t_{1b}$), then the time difference between the time stamp at timing marker "F" and the time stamp at timing marker "C" can be illustrated as Equation (10).

$$TS_F - TS_C = 2 + (t_{1b} - t_{1a}) \quad (10)$$

Based on Equation (10), the following conclusions can be drawn:

$TS_F - TS_C$ is less then two (2) seconds when $t_{1b}$ is less than $t_{1a}$.

$TS_F - TS_C$ is equal to two (2) seconds when $t_{1b}$ is equal to $t_{1a}$.

$TS_F - TS_C$ is greater than two (2) seconds when $t_{1b}$ is greater than $t_{1a}$.

The foregoing rules can be used to determine which one of a series of data sentences is most accurate.

Determining a Most Accurate Sample

Figure 9:
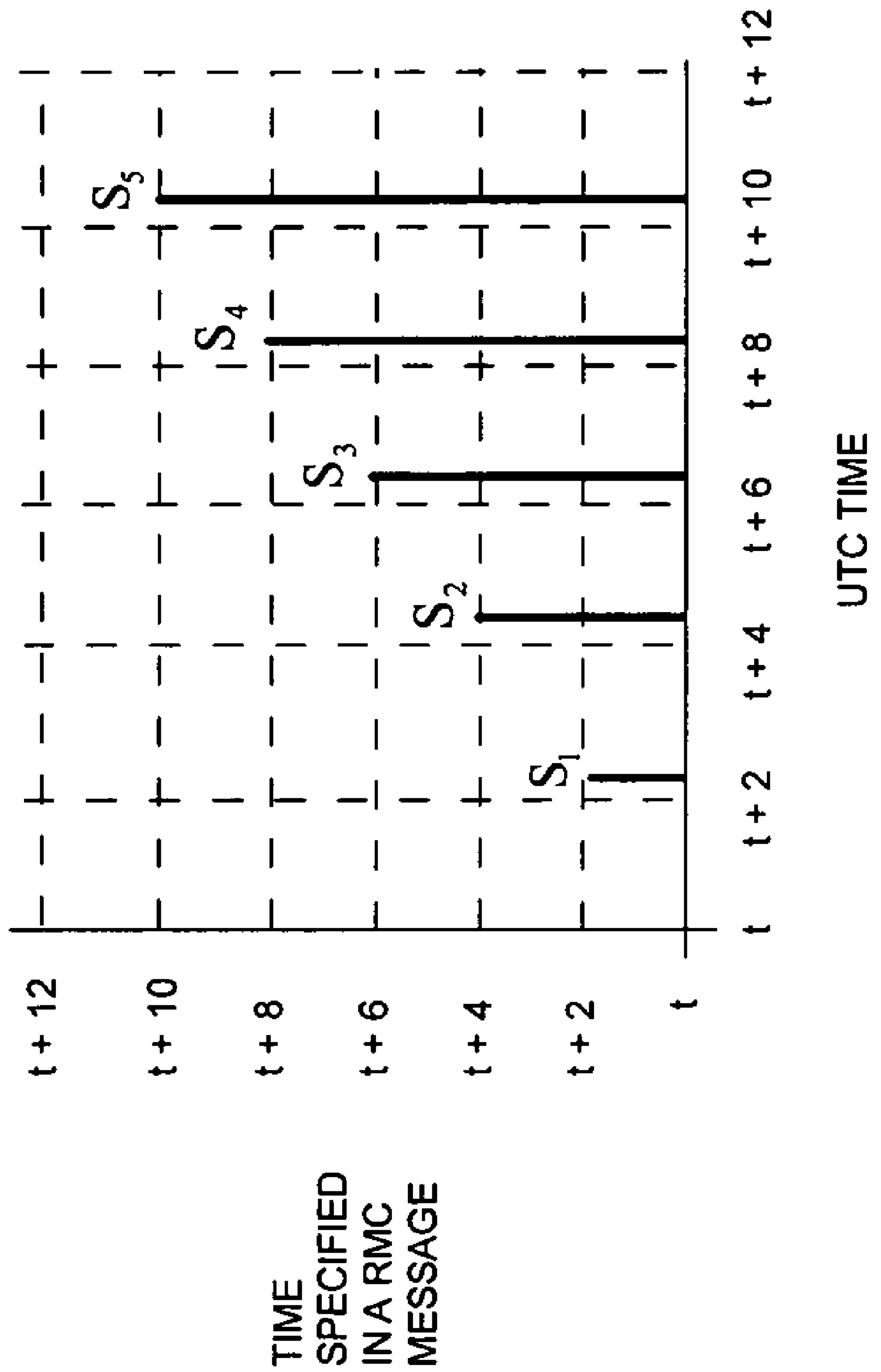
FIG. 9 is a time graph that is useful for understanding a timing error correction algorithm.
Figure 10:
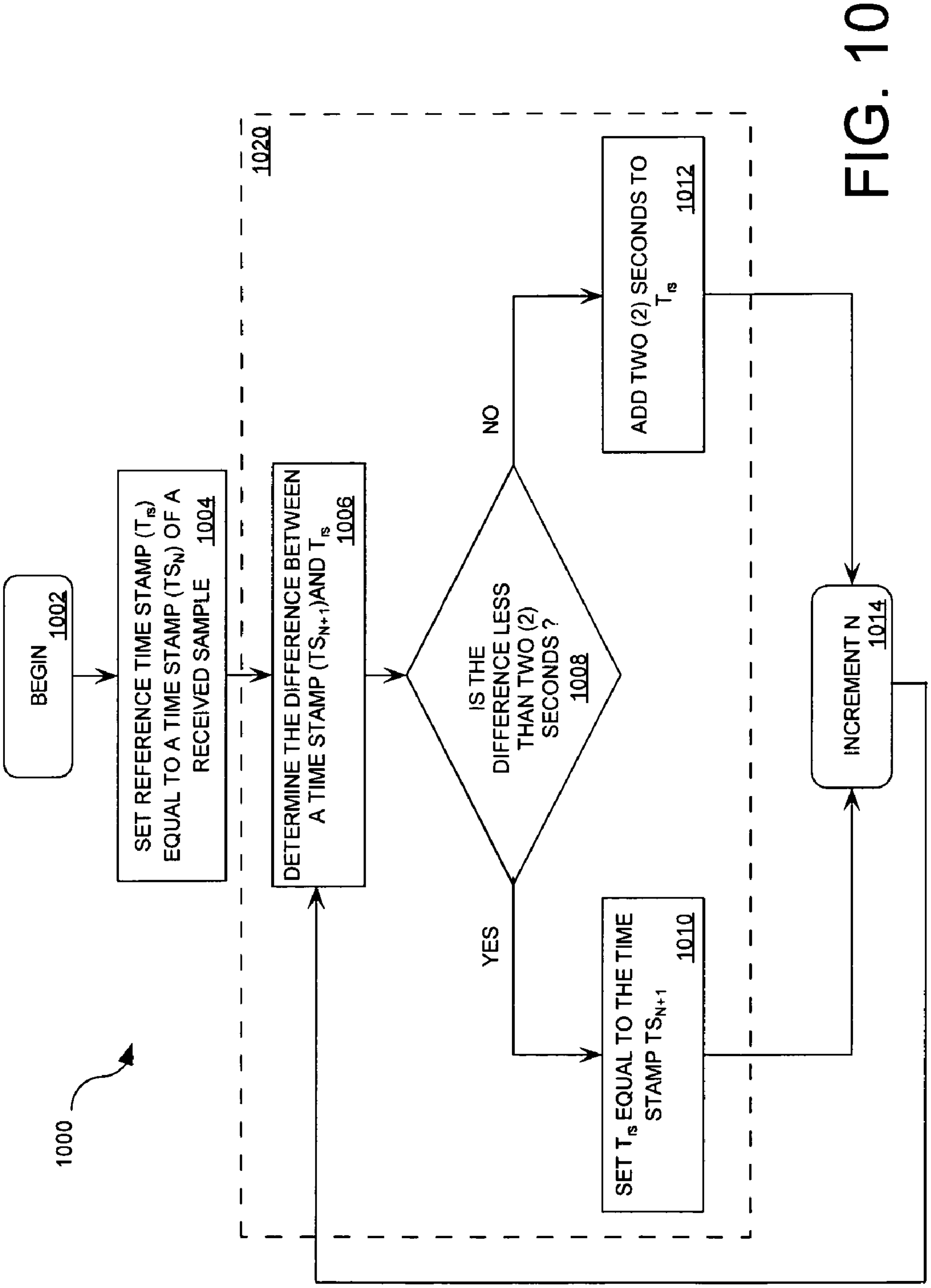
FIG. 10 is a flow chart illustrating a method for determining the most accurate sample that is useful for understanding an algorithm according to an embodiment of the invention.

Referring now to FIG. 9, there is provided a time graph plotting the time contained in an RMC message versus actual UTC time. Samples $S_1$ through $S_5$ represent the times samples (i.e., signals) are received at external device 106. Assuming that each sample is marked with a time stamp, the most accurate sample $S_1$ through $S_5$ can be determined using the rules outlined above. The method for determining the most accurate sample can be described as an algorithm. A process describing one example of such a method for the illustrated embodiment is shown in FIG. 10. In effect, the process seeks to identify the sample $S_n$ that is received by external device 106 with the least amount of processing delay. Less delay means that the UTC time contained in the data sentence will most closely match the actual UTC time at the moment the data sentence is first received by the external device 106.

Referring now to FIG. 10, method 1000 can begin with step 1002 and continue with step 1004. In step 1004, a reference time stamp ($T_{rs}$) is set equal to a time stamp ($TS_N$) of a received sample. For example, the first received sample could be $S_1$. $TS_N$ is a time stamp taken after a first frame of a sample is processed for placement in buffer 328. Thereafter, control can pass to step 1006 where a difference between a time stamp ($TS_{N+1}$) of a next received sample (e.g., $S_2$) and $T_{rs}$ can be determined. $TS_{N+1}$ is a time stamp taken after a first frame of the next sample is processed for placement in buffer 328. After determining the difference, method 1000 can continue with a decision step 1008. If the difference is less than two (2) seconds (1008:YES), $T_{rs}$ can be set equal to $TS_{N+1}$ in step 1010. After step 1010, step 1014 can be performed where method 1000 returns to step 1002. If the difference is greater than or equal to two (2) seconds (1008:NO), two (2) seconds can be added to $T_{rs}$ in step 1012. After step 1012, step 1014 can be performed where method 1000 returns to step 1006. The forgoing process can be repeated for a predefined number of samples (e.g., thirty samples).

The steps of block 1020 can be repeated for N samples to determine the most accurate sample $S_1$ through $S_N$. Referring now to FIG. 8, $TS_1$ can represent time stamp at timing marker "C" while $TS_2$ can represent time stamp at timing marker "F". Assuming timing marker "A" and timing marker "D" are two (2) seconds apart, $TS_1$ and $TS_2$ can occur two (2) seconds apart. For example, $TS_1$ and $TS_2$ will occur two (2) seconds apart if $t_{1a}=t_{1b}$ and $t_{2a}=t_{2b}$. $TS_1$ and $TS_2$ will occur less then two (2) seconds apart if $t_{1b}$ is shorter than $t_{1a}$ and/or $t_{2b}$ is shorter than $t_{2a}$. If $t_{1b}$ is shorter than $t_{1a}$, the time specified in the second data sentence will be more accurate (i.e., have less of a time delay introduced by GPS receiver 104) then the time specified in the first data sentence. If $t_{2b}$ is shorter than $t_{2a}$, the time specified in the second data sentence will also be more accurate (i.e., have less of a time delay introduced by a signals transmission) then the time specified in the first data sentence. If $t_{1b}$ is longer than $t_{1a}$ and/or $t_{2b}$ is longer than $t_{2a}$, the difference between $TS_2$ and $TS_1$ will be greater than two (2) seconds, indicating that the time specified in the second data sentence is less accurate than the time specified in the first data sentence.

A person skilled in the art will further appreciate that the time between data sentences sent from a GPS receiver 104 to an external device 106 can be a greater multiple of two (2) seconds. In such instances, method 1000 can be adjusted accordingly. For example, decision step 1008 can involve a determination of whether the difference is less than N×two (2) seconds.

A person skilled in the art will further appreciate that the method to determine the most accurate signal is one embodiment of such a method. However, the invention is not limited in this regard and any other suitable algorithm that determines the most accurate signal can be used without limitation.

Determining a Time to be Used for Setting a System Clock

Once a most accurate sample has been identified using the foregoing technique, a time for use in setting clock 324 can be determined. Referring again to FIG. 8, time at timing marker "G" ($T_G$) can be determined by first calculating $t_{1b}$, $t_{2b}$, and $t_{3b}$. After determining $t_{1b}$, $t_{2b}$, and $t_{3b}$, these values can be added to a time determined by a GPS receiver 104 as specified in a data sentence $T_D$ (i.e., $T_G=t_{1b}+t_{2b}+t_{3b}+T_D$). However, the values of $t_{1b}$, $t_{2b}$, and $t_{3b}$ can vary per sample. A method for determining the time at timing marker "G", which takes into account variable time delays, is shown in FIG. 11.

Figure 11:
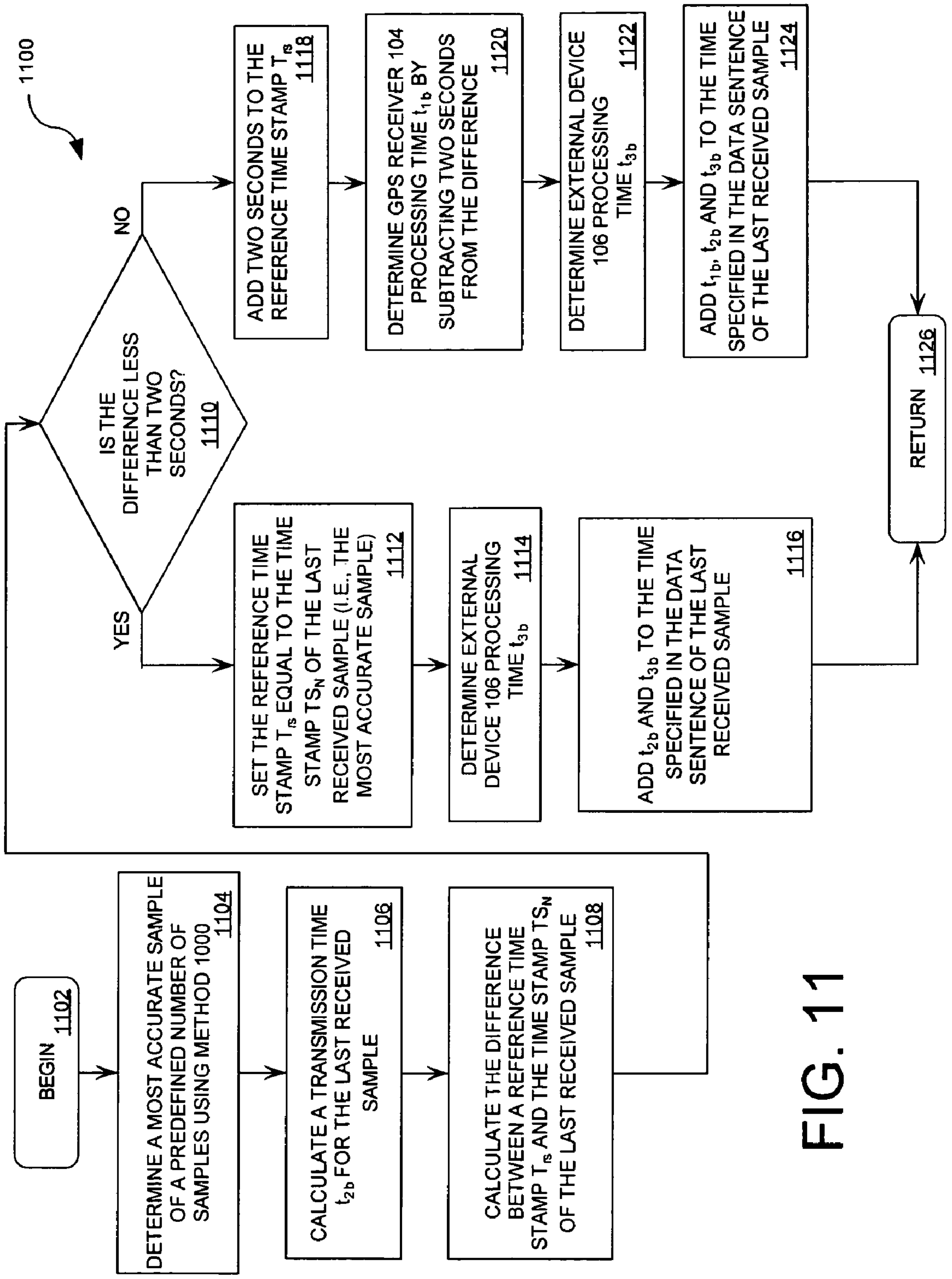
FIG. 11 is a flow chart that is useful for understanding a method for determining a time to be used in setting system clock.

Referring now to FIG. 11, method 1100 can begin with step 1102 and continue with step 1104. In step 1104, method 1000 described above can be performed for determining a most accurate sample. This step can involve repeating the steps of block 1020 to determine a most accurate sample of a predefined number of samples (e.g., thirty samples). After a most accurate sample is determined, control can pass to step 1106. In step 1106, a transmission time $t_{2b}$ can be calculated in accordance with Equation (7) described above. After calculating $t_{2b}$, step 1108 can be performed where a difference between a reference time stamp $T_{rs}$ and a time stamp $TS_n$ associated with the last received sample can be determined. After step 1108, method 1100 can continue with a decision step 1110.

If the difference is less than two (2) seconds (1110: YES), the reference time stamp $T_{rs}$ can be set equal to the time stamp $TS_n$ associated with the last received sample. This step can be performed to guarantee that a most accurate sample will be used to set clock 324. Subsequently, step 1114 can be performed where $t_{3b}$ can be calculated in accordance with Equation (8). After calculating $t_{3b}$, step 1116 can be performed where $t_{2b}$ and $t_{3b}$ are added to a UTC time $T_{UTC}$ specified in a data sentence of the last received sample. This step can be performed for determining a time for use in setting system clock 324. After determining a time for setting clock 324, step 1126 can be performed where method 1100 returns to step 1102.

If the difference is greater than or equal to two (2) seconds (1110: NO), step 1118 can be performed where two (2) seconds can be added to the reference time stamp $T_{rs}$. This step can be performed to guarantee that an earlier, more accurate sample, will be used to set clock 324. After step 1118, $t_{1b}$ can be calculated in step 1120. This step can involve subtracting two (2) seconds from the difference determined in step 1110. Thereafter, $t_{3b}$ can be calculated in accordance with Equation (8). After step 1122, step 1124 can be performed where $t_{1b}$, $t_{2b}$ and $t_{3b}$ are added to the UTC time $T_{UTC}$ specified in a data sentence of the last received sample. This step can be performed to determine a time to use in setting system clock 324. After determining a time for setting clock 324, step 1126 can be performed where method 1100 returns to step 1102.

Method 1100 can be explained with reference to FIG. 8. Referring now to FIG. 8, time at timing marker "G" can be determined differently in two (2) situations. In a first scenario, the difference between a time stamp at timing marker "C" and a time stamp at timing marker "F" is less than two (2) seconds. As mentioned above, this situation can occur if $t_{1b}$ is less than $t_{1a}$ and/or $t_{2b}$ is less than $t_{2a}$. Assuming that $t_{2a}$ is equal to $t_{2b}$, $t_{1b}$ is negligible (i.e., $t_{1b}$ is equal to 0.0 seconds) since time stamp at timing marker "C" and a time stamp at timing marker "F" should ideally be two (2) seconds apart. Therefore, the time at timing marker "G" can be determined by adding time $T_D$, $t_{2b}$, and $t_{3b}$ (i.e., $T_G=T_D+t_{2b}+t_{3b}$).

A second scenario exists where the difference between a time stamp at timing marker "C" and a time stamp at timing marker "F" is greater than or equal to two (2) seconds. As mentioned above, this situation can occur if $t_{1b}$ is greater than $t_{1a}$ and/or $t_{2b}$ is greater than $t_{2a}$. Assuming that $t_{2a}$ is equal to $t_{2b}$, $t_{1b}$ is not negligible (i.e., $t_{1b}$ is greater than 0.0 seconds) since the time stamp at timing marker "C" and the time stamp at timing marker "F" are greater than two (2) seconds apart. Thus, $t_{1b}$ must be accounted for in determining the time at timing marker "G" (i.e., $T_G=T_D+t_{1b}+t_{2b}+t_{3b}$).

A person skilled in the art will appreciate that the number of samples processed in step 1104 can be selected in accordance with a particular method application. A person skilled in the art will further appreciate that the time between data sentences sent from a GPS receiver 104 to an external device 106 can be a greater multiple of two (2) seconds. In such instances, method 1100 can be adjusted accordingly. For example, decision step 1110 can involve a determination of whether the difference is less than N×two (2) seconds.

A person skilled in the art will further appreciate that method 1100 is one embodiment of a method to calculate an amount of correction to be added to future reference times. However, the invention is not limited in this regard and any other suitable method that calculates an amount of correction to be added to a future reference time can be used without limitation.

Tracking a Number of Bytes Associated with a Reference Time for Use in Calculating a Transmission Time for a First Frame of a Data Sentence Data sentences, sent from GPS receiver 104 to external device 106, can be divided into frames (i.e., a series of bytes) for transmission. Each frame can vary in size (i.e., contain all or a portion of a data sentence's data). For example, GPS receiver 104 can send three hundred (300) bytes of data to external device 106. To transmit the three hundred (300) bytes of data, GPS receiver 104 can break the data into frames having a number of bytes in accordance with a GPS application, such as 75, 100, and/or 175 bytes.

A correction process can be provided to correct for timing variations that are introduced as a result of varying amounts of data bytes contained in the first frame of the data sentence. Varying amounts of data in the first frame of each data sentence can result in different data transfer times from one data sentence to the next. Combining this additional correction step to the process described above results in the following process to correct for such errors. Such a correction process is illustrated in FIG. 12.

Figure 12:
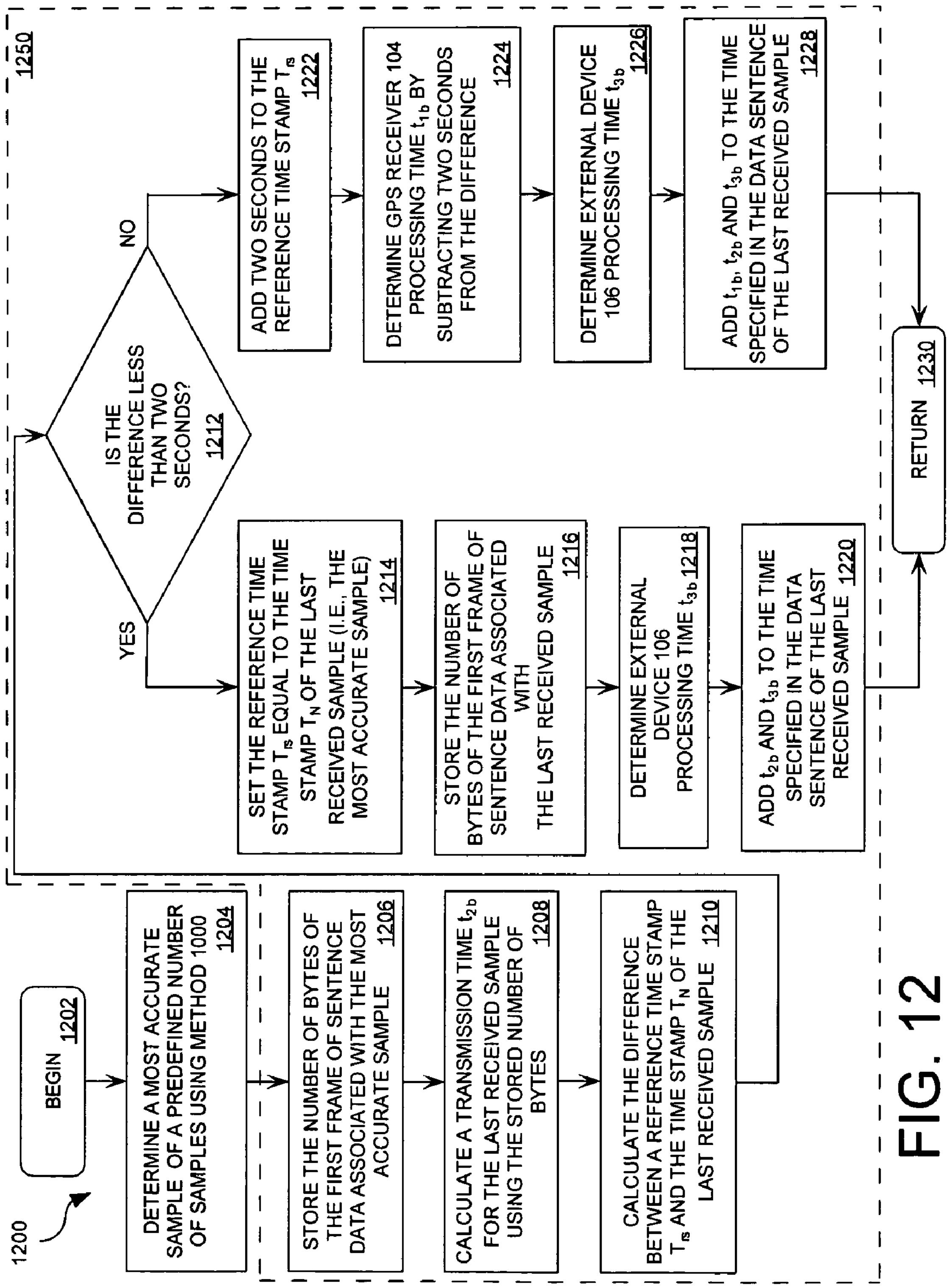
FIG. 12 is a flow chart that is useful for understanding a method for tracking the number of bytes associated with a reference time stamp.

Referring now to FIG. 12, method 1200 can begin with step 1202 and continue with step 1204. In step 1204, method 1000 described above can be performed for determining a most accurate sample. This step can involve repeating steps in block 1020 to determine a most accurate sample of a predefined number of samples (e.g., thirty samples). After a most accurate sample is determined, control can pass to step 1206. In step 1206, the number of bytes associated with the most accurate sample can be stored in memory 318. After storing the number of bytes, step 1208 can be performed where a transmission time $t_{2b}$ can be calculated using a value that specified the number of bytes in the first frame of a data sentence (i.e., $F_s$). This step can involve performing a software routine implemented on hardware entity 320 for calculating $t_{2b}$ using Equation (7) described above. After calculating $t_{2b}$, step 1210 can be performed where a difference between a reference time stamp $T_{rs}$ and a time stamp $T_N$ associated with the last received sample can be determined. After step 1210, method 1200 can continue with a decision step 1212.

If the difference is less than two (2) seconds (1212: YES), the reference time stamp $T_{rs}$ can be set equal to the time stamp $T_N$ associated with the last received sample in step 1214. This step can be performed to guarantee that a most accurate sample will be used to set clock 324. Subsequently, step 1216 can be performed where the number of bytes associated with the last received sample can be stored in memory 318. Thereafter, step 1218 can be performed where $t_{3b}$ can be calculated in accordance with Equation (8) described above. After calculating $t_{3b}$, step 1220 can be performed where $t_{2b}$ and $t_{3b}$ can be added to the UTC time $T_{UTC}$ specified in a data sentence of the last received sample. This step can be performed for determining a time for use in setting clock 324. After determining a time for setting clock 324, step 1230 can be performed where method 1200 returns to step 1202.

If the difference is greater than or equal to two (2) seconds (1212: NO), step 1222 can be performed where two (2) seconds can be added to the reference time stamp $T_{rs}$. This step can be performed to guarantee that a most accurate sample will be used to set clock 324. After step 1222, $t_{1b}$ can be calculated in step 1224. This step can involve subtracting two (2) seconds from the difference determined in step 1212.

Thereafter, $t_{3b}$ can be calculated in accordance with Equation (8). After step 1226, step 1228 can be performed where $t_{1b}$, $t_{2b}$ and $t_{3b}$ can be added to the UTC time $T_{UTC}$ specified in a data sentence of the last received sample. This step can be performed for determining a time for use in setting system clock 324. After determining a time for setting clock 324, step 1230 can be performed where method 1200 returns to step 1202.

As illustrated by the method 1200, the number of bytes associated with $T_{rs}$ can be tracked by storing the number of bytes contained in a first frame of a data sentence. This step can be repeated each time $T_{rs}$ is set equal to a new time stamp $TS_N$. Notably, $t_{2b}$ can be accurately calculated using the updated value that specified the number of bytes in the first frame of a data sentence (i.e., $F_s$) associated with $T_{rs}$.

A person skilled in the art will further appreciate that the time between data sentences sent from a GPS receiver 104 to an external device 106 can be a greater multiple of two (2) seconds. In such instances, method 1200 can be adjusted accordingly. For example, decision step 1212 can involve a determination of whether the difference is less than N×two (2) seconds.

A person skilled in the art will further appreciate that the method to track the number of bytes associated with a reference time is one embodiment of such a method. However, the invention is not limited in this regard and any other suitable algorithm that tracks the number of bytes associated with a reference time stamp can be used without limitation.

Correcting for Timing Errors Introduced into Time Stamp Values by a System Clock Clock 324 can have an accuracy of one pulse per million (i.e., clock 324 can output between 999,999 and 1,000,001 pulses). If the frequency of clock 324 is one million pulses per one (1) second, then an output of 999,999 pulses can result in a −0.000001 second error. Similarly, an output of 1,000,001 pulses can result in a +0.000001 second error.

As mentioned above, clock 324 can be used for marking one or more frames with a time stamp. In effect, timing error can be introduced into time stamp values. For example, clock 324 can take a first time stamp $TS_1$ and a second time stamp $TS_2$. Assuming that $TS_1$ and $TS_2$ are one (1) second apart, $TS_2$ can have a value falling within the range of 0.999999 to 1.000001 second. Assuming that $TS_1$ and $TS_2$ are two (2) seconds apart, $TS_2$ can have a value falling within the range of 1.999998 to 2.000002 seconds. This error can accumulate over time such that after one (1) hour an error within the range of −3.6 ms to +3.6 ms can be introduced into future time stamp values.

A correction process can be provided to correct for timing variations that are introduced as a result of system clock's 324 performance. Combining this additional correction step to the process described above results in the following process to correct for such errors. Such a correction process is illustrated in FIG. 13.

Method 1300 can be performed for correcting a system clock 324 timing error by periodically restarting (i.e., removing all accumulated errors) at the expiration of a defined period of time (e.g., one hour). Also in accordance with this correction process, method 1300 can use a first most accurate sample while simultaneously determining a second most accurate sample. Once a second most accurate sample is determined, method 1300 can stop use of the first most accurate sample and begin use of the second most accurate sample. Such a process can periodically remove accumulated timing errors introduced into time stamp values by a system clock 324.

Figure 13:
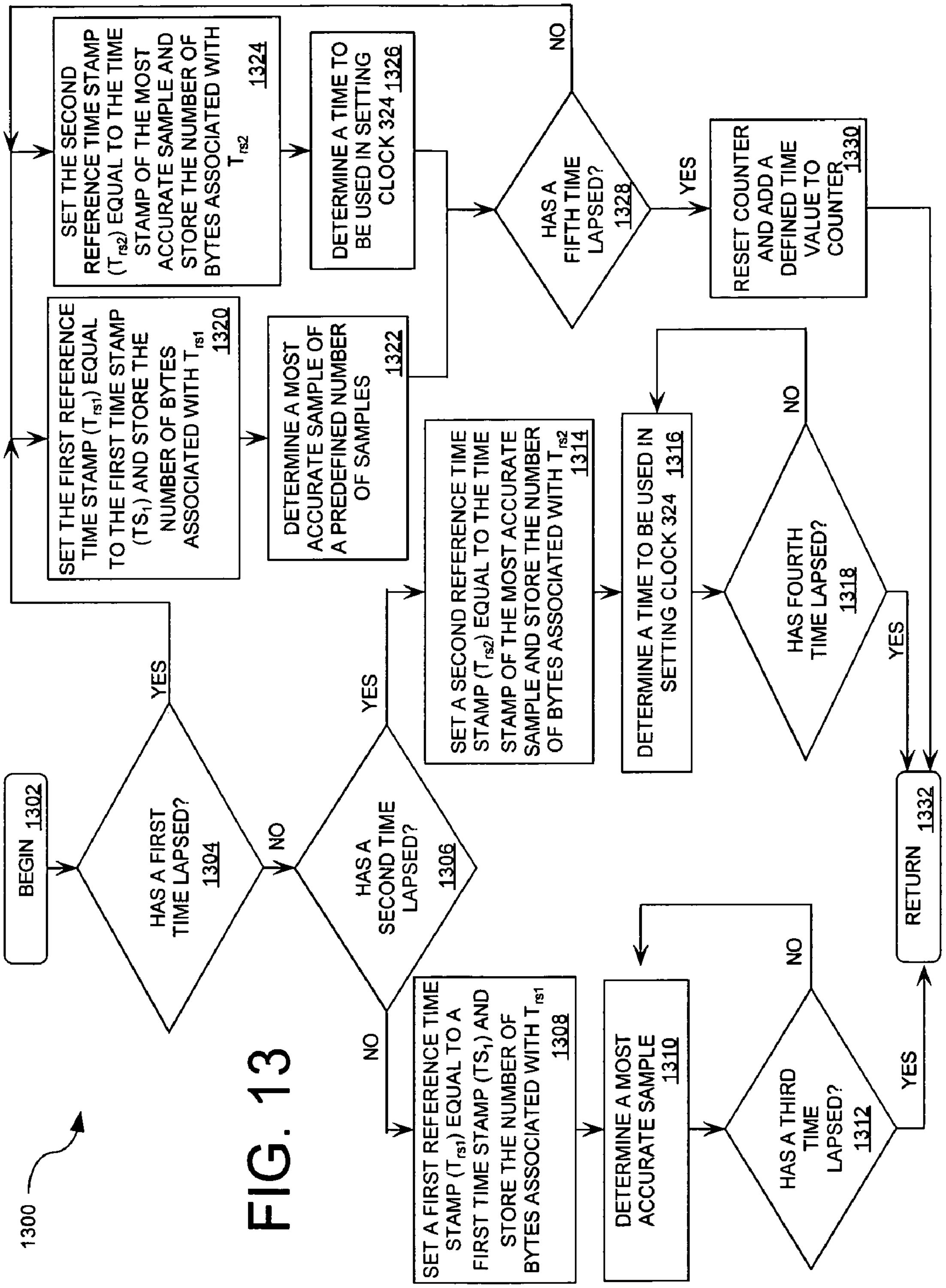
FIG. 13 is a flow chart that is useful for understanding a method for correcting a system clock's timing error.

Referring now to FIG. 13, method 1300 can begin with step 1302 and continue with a decision step 1304. If a first increment of time (e.g., one hour=1800 samples×two seconds) has not lapsed (1304:NO), control can pass to decision step 1306. If a second increment of time (e.g., one minute=thirty samples×two seconds) has not lapsed (1306:NO), step 1308 can be performed where a first reference time stamp $T_{rs1}$ is set equal to a first time stamp $TS_1$. Also, a value that specifies the number of bytes associated with $T_{rs1}$ can be stored in memory 318. After step 1308, a most accurate sample can be determined using method 1000 described above. This step can involve performing the steps of block 1020 of FIG. 10. After determining a most accurate sample, control can pass to a decision step 1312. If a third increment of time (e.g., one minute=thirty samples×two seconds) has not lapsed (1312: NO), method 1300 can return to a 1310. If a third increment of time has lapsed (1312: YES), step 1332 can be performed where method 1300 returns to step 1302.

If a second increment of time has lapsed (1306:YES), step 1314 can be performed where a second reference time stamp $T_{rs2}$ can be set equal to a time stamp $T_N$ of the most accurate sample. Also, a value that specifies the number of bytes associated with $T_{rs2}$ can be stored in memory 318. Subsequently, step 1316 can be performed where a time to use in setting clock 324 can be determined. This step can involve performing the steps of block 1250 of method 1200 described above. After determining a time to use in setting clock 324, control can pass to a decision step 1318. If a fourth increment of time (e.g., one hour=1800 samples×two seconds) has not lapsed (1318:NO), control can return to step 1316. If a fourth increment of time has lapsed (1318:YES), step 1332 can be performed where method 1300 returns to step 1302.

If a first increment of time has lapsed (1304:YES), method 1300 can concurrently perform steps 1320, 1322 and steps 1324, 1326. In step 1320, $T_{rs1}$ can be set equal to $TS_1$. Also, a value that specifies the number of bytes associated with $T_{rs1}$ can be stored in memory 318. After step 1320, step 1322 can be performed where a most accurate sample can be determined. This step can involve repeating the steps of block 1020 of FIG. 10 for a predefined number of samples (e.g., thirty samples). After step 1322, control can pass to a decision step 1328. If a fifth increment of time (e.g., one hour, one minute) has not lapsed (1328:NO), control will return to step 1320. If a fifth increment of time has lapsed (1328:YES), control will pass to step 1330 where a counter can be reset. Also, a defined time value (e.g., one minute) can be added to the counter. After step 1330, step 1332 can be performed where method 1300 can return to step 1302.

In step 1324, $T_{rs2}$ can be set equal to a time stamp $T_N$ of the most accurate sample determined in step 1322. Also, a value that specifies the number of bytes associated with $T_{rs2}$ can be stored in memory 318. After step 1324, step 1326 can be performed where a time to use in setting clock 324 can be determined. This step can involve performing the steps of block 1250 of FIG. 12 described above. After step 1326, control can pass to a decision step 1328. If a fifth increment of time (e.g., two hours) has not lapsed (1328:NO), control will return to step 1326. If a fifth increment of time has lapsed (1328:YES), control will pass to step 1330 where a counter can be reset. Also, a defined time value (e.g., one hour) can be added to the counter. After step 1330, step 1332 can be performed where method 1300 returns to step 1302.

A person skilled in the art will appreciate that method 1300 is one embodiment of a method to compensate for timing errors introduced by a system clock 324. However, the invention is not limited in this regard and any other suitable method that compensates for such timing errors can be used without limitation.

A Method to Synchronize a System Clock of an External Device with a UTC Time

In view of the forgoing, a method for implementation on external device 106 can be provided to accurately synchronize its system clock 324 with a UTC time. The method can compensate for variable time delays introduced into a synchronization method 400 by a process performed by a GPS device 104, a data sentence transmission from a GPS device 104 to an external device 106, and a data processing step performed by an external device 104. The method can also correct for timing errors introduced by a system clock 324. Such a method is shown in FIG. 14A and FIG. 14B.

Figure 14A:
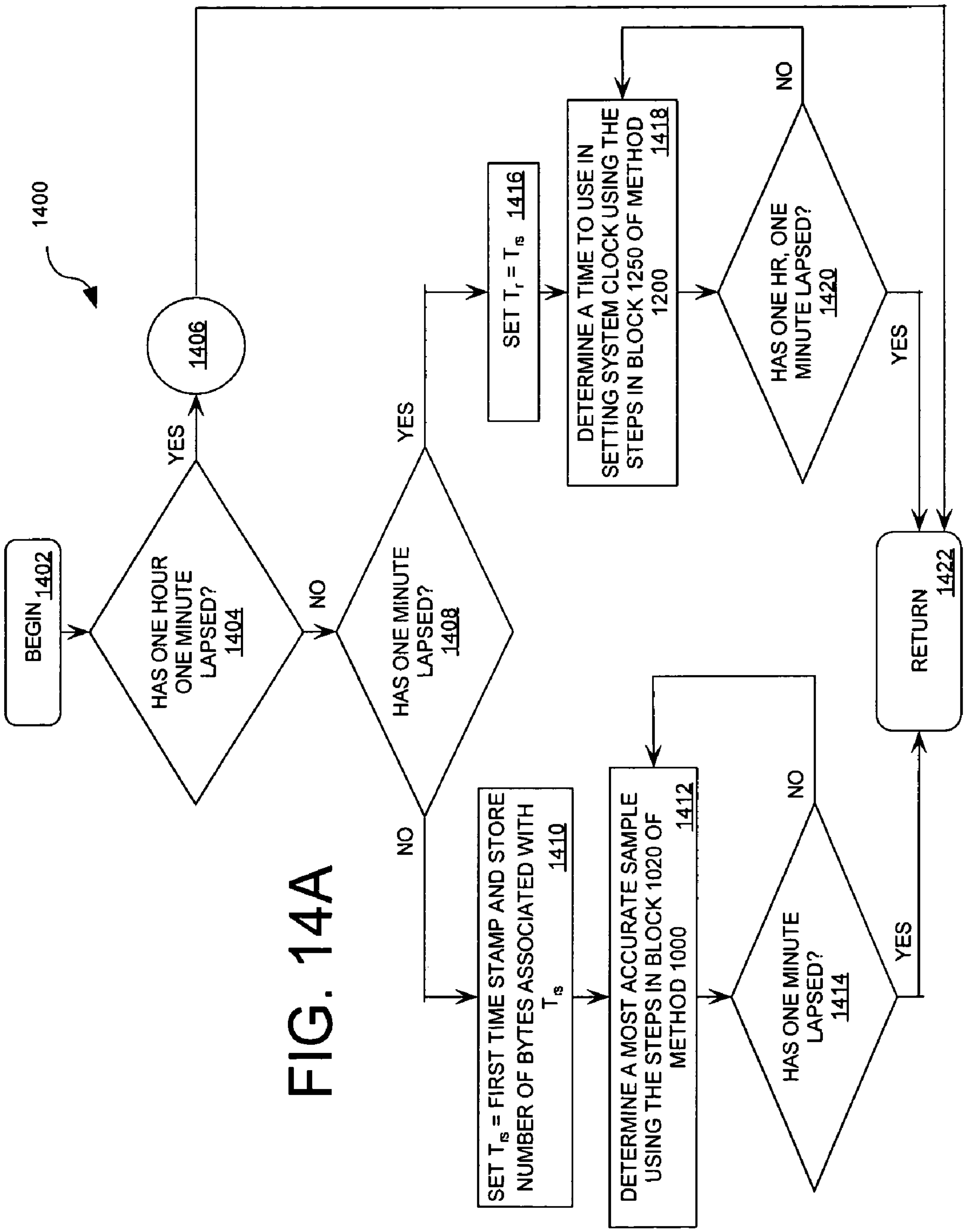
FIG. 14A is a flow chart illustrating a portion of a process for correcting a timing error associated with a GPRMC message.
Figure 14B:
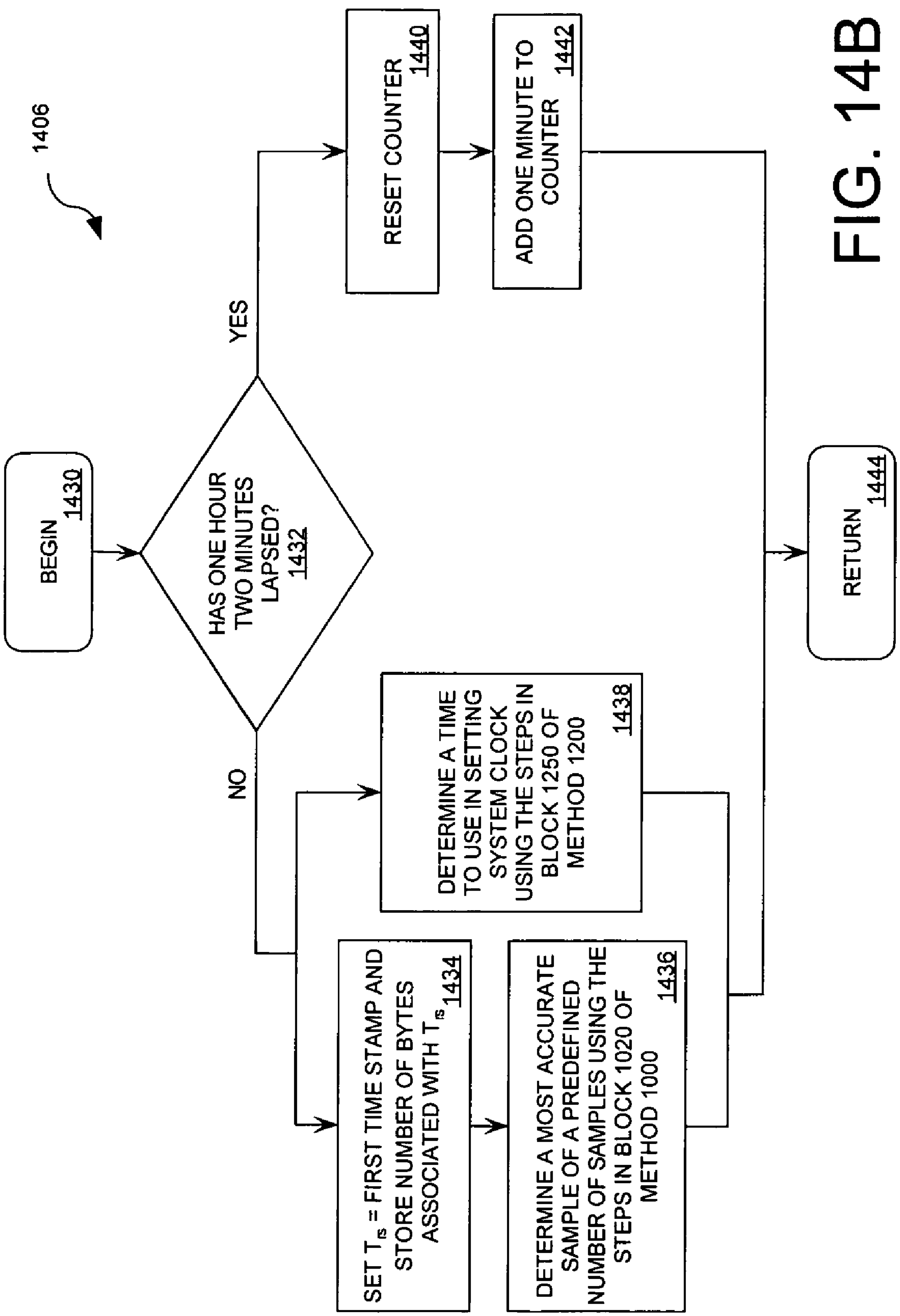
FIG. 14B is a flow chart illustrating a portion of a process for correcting a timing error associated with a GPRMC message.

Referring now to FIG. 14A, there is provided a flow chart illustrating a portion of a process for correcting a timing error associated with a GPRMC message. Method 1400 can begin at step 1402 and continue with a decision step 1404. If one hour one minute has lapsed (1404: YES), control can pass to step 1406. Step 1406 will be described in detail below (in relation to FIG. 14B). After step 1406, step 1422 can be performed where method 1400 returns to step 1402.

If one hour one minute has not lapsed (1404: NO), control can pass to a decision step 1408. If one minute has lapsed (1408: NO), control can pass to step 1410. In step 1410, a synchronization reference time $T_{rs}$ can be set equal to a first time stamp $TS_1$. Also, a value that specifies the number of bytes associated with $T_{rs}$ can be stored. After storing the number of bytes associated with $T_{rs}$, step 1412 can be performed where a most accurate sample is determined. This step can involve performing the steps in block 1020 of FIG. 10 described above. After step 1412, control can pass to a decision step 1414. If one minute has not lapsed (1014: NO), method 1400 can return to step 1412. If one minute has lapsed (1014: YES), step 1422 can be performed where method 1400 can return to step 1402.

If one minute has lapsed (1408: YES), control can pass to step 1416. In step 1416, a reference time $T_r$ can be set equal to $T_{rs}$. After setting $T_r$, step 1418 can be performed where a time to use in setting a system clock is determined. This step can involve performing the steps in block 1250 of FIG. 12 described above. After step 1418, control can pass to a decision step 1420. If one hour one minute has not lapsed (1420: NO), method 1400 can return to step 1418. If one hour, one minute has lapsed (1420: YES), step 1422 can be performed where method 1400 returns to step 1402.

Referring now to FIG. 14B, there is provided a flow chart illustrating a portion of a process for correcting a timing error associated with a GPRMC message. Step 1406 can begin with step 1430 and continue with a decision step 1432. If one hour two minutes has not lapsed (1432: NO), steps 1434, 1436 can be performed simultaneously with step 1438. In step 1434, $T_{rs}$ can be set equal to a first time stamp $TS_1$. Also, a value that specifies the number of bytes associated with $T_{rs}$ can be stored. After storing the number of bytes associated with $T_{rs}$, a most accurate sample can be determined. This step can involve repeating the steps in block 1250 for a predefined number of samples (e.g., thirty samples). After determining a most accurate sample, step 1444 can be performed where control can return to step 1430.

Step 1438 can be performed for determining a time to use in setting a system clock 324. This step can involve performing the steps in block 1250 of FIG. 12 described above. After performing step 1438, step 1444 can be performed where control can return to step 1430.

If one hour two minutes has lapsed (1432: YES), a counter can be reset in step 1440. After resetting the counter, step 1442 can be performed where one minute is added to the counter. After adding one minute to the counter, step 1444 can be performed where control can return to step 1430.

A person skilled in the art will appreciate that the method 1400 may be implemented in hardware entities 320 using a programming language (e.g., C or C++) compatible with an external device 106 operating environment. A person skilled in the art will also appreciate that the designated times of steps 1404, 1408, 1414, 1420, 1432, 1442 are selected merely for exemplary purposes. Any time values that are in accordance with a particular synchronization method can be used without limitation. A person skilled in the art will further appreciate that the time between data sentences sent from a GPS receiver 104 to an external device 106 can be a greater multiple of two (2) seconds. In such instances, method 1400 can be adjusted accordingly.

A person skilled in the art will further appreciate that the method of FIG. 14A-B is one embodiment of a method for synchronization of clock 324 that compensates for variable time delays. However, the invention is not limited in this regard and any other suitable method can be used without limitation provided variable time delays introduced by a GPS receiver, a transmission time, and an external device are corrected.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for synchronization of a clock of an external device with a GPS device, comprising:

processing a plurality of data sentences received at said external device from said GPS device to determine a data sentence containing a best available time information that is most accurate among said plurality of data sentences;

determining an amount of correction to compensate for at least one variable time delay introduced by at least one process selected from the group consisting of a process performed by said GPS device, a data sentence transmission from said GPS device to said external device, and a data processing step performed by said external device;

determining a synchronization time using said amount of correction and said best available time information; and correcting a timing error introduced by said external device clock.

2. The method of claim 1, wherein said processing said plurality of data sentences comprises associating a time stamp with each of said plurality of data sentences.

3. The method of claim 2, wherein said processing said plurality of data sentences further comprises setting a first reference time stamp equal to a time stamp associated with a first data sentence of said plurality of data sentences.

4. The method of claim 3, wherein said processing said plurality of data sentences further comprises determining a difference between a time stamp associated with a second data sentence of said plurality of data sentences and said first reference time stamp.

5. The method of claim 4, wherein said processing said plurality of data sentences further comprises setting said first reference time stamp equal to said time stamp associated with a second data sentence if said difference is less than a defined time increment.

6. The method of claim 5, wherein said processing said plurality of data sentences further comprises adding said defined time increment to said first reference time stamp if said difference is equal to or greater than said defined time increment.

7. The method of claim 1, wherein said determining an amount of correction comprises setting a second reference time stamp equal to a time stamp associated with said most accurate data sentence.

8. The method of claim 7, wherein said determining an amount of correction further comprises storing the number of bytes of a first frame of sentence data associated with said most accurate data sentence.

9. The method of claim 8, wherein said determining an amount of correction further comprises calculating a transmission time defining a time interval associated with transmitting said last received data sentence from said GPS device to said external device.

10. The method of claim 9, wherein said determining an amount of correction further comprises calculating a difference between said second reference time stamp and a time stamp associated with said last received data sentence.

11. The method of claim 10, wherein said determining an amount of correction further comprises setting said second reference time stamp equal to said time stamp associated with said last received data sentence only if said difference is less than a defined time increment.

12. The method of claim 11, wherein said determining an amount of correction further comprises storing a number of bytes of a first frame of sentence data associated with said last received data sentence if said difference is less than a defined time increment.

13. The method of claim 12, wherein said determining an amount of correction further comprises determining an external device processing time if said difference is less than a defined time increment.

14. The method of claim 13, wherein said determining a synchronization time comprises adding said transmission time, said external device processing time, and a time specified in a data sentence associated with said last received data sentence only if said difference is less than a defined time increment.

15. The method of claim 9, wherein said determining an amount of correction further comprises adding said defined time increment to said second reference time stamp only if said difference is equal to or greater than said defined time increment.

16. The method of claim 15, wherein said determining an amount of correction further comprises determining a GPS device processing time if said difference is equal to or greater than said defined time increment.

17. The method of claim 16, wherein said determining a GPS device processing time comprises subtracting a predefined time increment from said difference.

18. The method of claim 17, wherein said determining an amount of correction further comprises determining an external device processing time if said difference is equal to or greater than said defined time increment.

19. The method of claim 18, wherein said determining a synchronization time comprises adding said transmission time, said GPS device processing time, said external device processing time, and a time specified in a data sentence associated with said last received data sentence only if said difference is equal to or greater than said defined time increment.

20. The method of claim 1, wherein said correcting a timing error introduced by said external device clock comprises removing an accumulate error by restarting said method after a predefined amount of time.

* * * * *